United States Patent

[11] 3,622,637

| [72] | Inventor | Thomas F. Cleary<br>Summit, N.J. |
|---|---|---|
| [21] | Appl. No. | 798,145 |
| [22] | Filed | Feb. 10, 1969 |
| [45] | Patented | Nov. 23, 1971 |
| [73] | Assignee | Centerchem, Inc.<br>New York, N.Y. |

[54] METHOD OF PRODUCING 2,2'-METHYLENE BIS(3,4,6-TRICHLOROPHENOL)
10 Claims, No Drawings

[52] U.S. Cl. .................................................... 260/619
[51] Int. Cl. ................................................... C07c 39/16
[50] Field of Search ........................................ 260/619 A

[56] References Cited
UNITED STATES PATENTS

| 2,730,554 | 1/1956 | Schetty et al. | 260/619 (A) |
|---|---|---|---|
| 2,812,365 | 11/1957 | Gump et al. | 260/619 (A) |
| 2,435,593 | 2/1948 | Luthy et al. | 260/619 (A) |
| 3,072,677 | 1/1963 | Lei | 260/619 (A) |
| 3,408,408 | 10/1968 | Drew et al. | 260/619 (A) |
| 3,456,020 | 7/1969 | Cleary | 260/619 (A) |

*Primary Examiner*—Bernard Helfin
*Attorneys*—Charles E. Baxley and Thomas E. Tate ABSTRACT: This invention is directed to a method of producing 2,2'-methylene bis (3, 4, 6-trichlorophenol), commonly known as hexachlorophene, in which (1) 1 mol of 2, 4, 5-trichlorophenol is reacted with 1 mol of formaldehyde, in a solvent, and under the influence of an acid catalyst to form 1 mol of a trichlorophenyl hemiformal; (2) another mol of 2, 4, 5-trichlorophenol is reacted with chlorosulfonic acid, in the presence or absence of a solvent, to form 1 mol of a trichlorophenyl ester of sulfuric acid; and (3) 1 mol of each of the products from steps (1) and (2) are reacted, in the presence of a solvent, to form one mol of hexachlorophene.

METHOD OF PRODUCING 2,2'-METHYLENE BIS(3,4,6-TRICHLOROPHENOL)

THE INVENTION

This invention relates generally to new and useful improvements for the production of 2,2'-methylene bis (3,4,6-trichlorophenol), commonly called hexachlorophene, and particularly seeks to provide a novel three stage process for producing same in a shorter reaction time than heretofore possible and under high yield conditions sufficient to result in a product of commercially acceptable purity.

Publicly know processes for the production of hexɟ achlorophene[2,2'-methylene bis (3,4,6-trichlorophenol)]involve the condensation, in a single stage, of 2 mols of 2,4,5-trichlorophenol with 1 mol of formaldehyde (as formalin or paraformaldehyde). The usual condensing agent is concentrated sulfuric acid or weak oleum, and the reaction may be carried out in the presence or absence of a solvent which is inert to the reactants and to the condensing agent.

In such processes it has been customary to mix all of the rectants (and the solvent, if any) at once and to heat the mixture, with agitation, for a certain time. Conditions such as these are disadvantageous in the production of hexachlorophene in that:

1. They tend to promote the formation of color bodies which make difficult the purification of the prodcut;
2. They tend to promote the formation of the byproduct 2,4,5-trichlorobenzodioxolane with an attendant lose of yield;
3. They require, if acceptable yields are to be obtained extreme care that the 2,4,5-trichlorophenol and formaldehyde be present in exactly the molar ratio of 2.00:1.00. Since the composition of formalin or of formaldehyde is usually imprecise, and since a certain amount of formaldehyde is lost from the reaction mixture by volatilization, this is a difficult requirement to realize in practice.

More recently, several of these disadvantages have been overcome through the process disclosed and claimed in my copending application Ser. No. 686,290, filed Nov. 28, 1967 and now Pat. No. 3,456,020 issued July 15, 1969 in which hexachlorophene is produced by a two stage process in which 1 mole of 2,4,5-trichlorophenol and 1 mol of formaldeyde are reacted under the influence of an acid catalyst, after which the reaction product is condensed with an added mol of 2,4,5-trichlorophenol through the agency of chlorosulfonic acid or fluorosulfonic acid.

However, the process of this invention provides further improvements in the production of hexachlorophene in that it provides higher yields, better process control and better material efficiency.

Therefore, an object of this invention is to provide a new method of producing hexachlorophene from previously known source materials which is more effective and results in higher yields by comparison with prior processes.

Another object of this invention is to provide a process of the character stated that is carried out in three stages in which (1) 1 mole of 2,4,5-trichlorophenol is reacted with 1 mol of formaldehyde, in a solvent, and under the influence of an acid catalyst to form a hemiformal; (2) reacting another mol of 2,4,5-trichlorophenol with 1 mol of chlorosulfonic acid, in the presence or absence of a solvent to form a sulfuric ester of trichlorophenol; and (3) reacting 1 mol each of the hemiformal and the sulfuric ester, in the presence of a solvent, to form 1 mol of hexachlorophene.

With these and other objects, the nature of which will be apparent, the invention will be more fully understood by reference to the accompanying detailed description and the appended claims.

In accordance with this invention it has been discovered that:

1. One mol of 2,4,5-trichlorophenol will react with 1 mol of formaldehyde, in a solvent, under the influence of an acid catalyst, and under reaction conditions which will not produce any hexanchlorophene, to from a hemiformal, in accordance with the following equation:

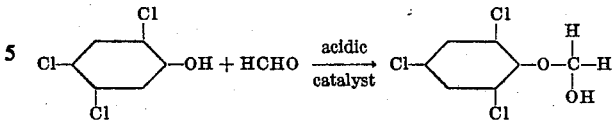

The reaction product is a white, needlelike crystal-line compound having a melting point of 78° C. It is insoluble in aqueous alkali, but is gradually decomposed by warm aqueous alkali to 2,4,5-trichlorophenol and formaldehyde.

The acid catalysts which will bring about this reaction include benzenesulfonic acid, toluenesulfonic acid, dry or aqueous HCl, and dilute sulfuric acid.

The solvents useful as media for this reaction include benzene, toluene, liqroin, methylene chloride, ethylene chloride, chloroform, and perchloroethylene.

2. One mol of 2,4,5-trichlorophenol will react with 1 mol of chlorosulfonic acid, in the presence or absence of a solvent, to form a trichlorophenyl ester of sulfuric acid, in accordance with the following equation:

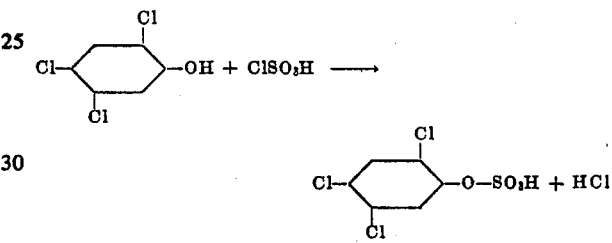

The resulting sulfuric acid ester is a white crystal-line compound occuring in long deliquescent needles which decompose rapidly when exposed to moisture, into 2,4,5-trichlorophenol and sulfuric acid.

3. One mol of the hemiformal described under (1), above, the 1 mol of the sulfuric ester, described under (1), above, the 1 mol of the sulfuric ester, described under (2), above, will react together, in the presence of a solvent, to form 1 mol of hexachlorophene, in accordance with the following equation:

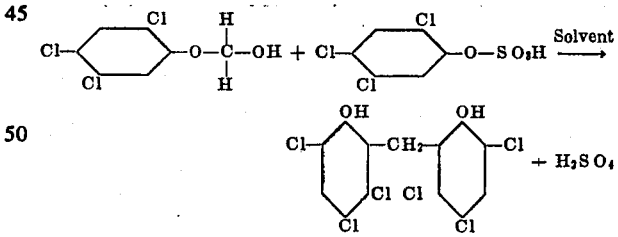

The solvents useful as media for carrying out this reaction include benzene, toluene, dipropyl ether, methylene chloride, ethylene chloride, chloroform, perchloroethylene, and mixtures thereof.

In practice, the HCl generated in reaction 2. may be used as the acid catalyst to being about reaction 1., as described in the following example:

EXAMPLE 1

197.5 of 2,4,5-trichlorophenol having a melting point of 66° C., is dissolved in 1 liter of chloroform, and the solution is warmed to 40° C. There is added dropwise, with good agitation, 116 g. of chlorosulfonic acids over a period of 1 hour. The reaction is mildly exothermic. The evolving HCl is bubbled into a second solution of 197.5 g. of 2,4,5-trichlorophenol and 30 g. of paraformaldehyde in 1 liter of chloroform, which is agitated and maintained at 55° C. by external heating.

When the additional of chlorosulfonic acid is completed, the reaction mixture is both vessels is completely clear. The first reaction mixture contains 1 mol of 2,4,5-trichlorophenyl sulfate, and the second contains 1 mol of 2,4,5-trichlorophenyl hemiformal.

The two clear solutions are mixed, and heated to reflux, with good agitation, for 4 hours. The reaction mixture is then allowed to stand without agitation for 1 hour, while the sulfuric acid which is formed in the reaction settles to the bottom. The sulfuric acid is separated and the remaining hot chloroform solution is stirred with 10 g. of activated charcoal, filtered, and cooled to 10° C. The formed crystals of hexachlorophene are filtered off, washed with cold chloroform and dried, yielding 310 g., having a melting point of 162°–164° C. Concentration of the mother liquor yields an additional 65 g., also having a melting point of 162°–164° C.

The total yield of 375 g. is about 92 percent of the theoretical yield and the product is of commercially salable purity.

It will be noted that in the preceding example 1 the above described reaction (1) is effected by bubbling HCl into a solution of 197.5 g. of 2,4,5-trichlorophenol and 30 g. of paraformaldehyde in 1 liter of chloroform as the solvent.

Other typical examples for effecting reaction (1) are given below:

EXAMPLE 2

197.5 g. of 2, 4, 5-trichlorophenol having a melting point of 62° C. and 50 g. of benzenesulfonic acid are dissolved in 500 ml. of benzene, and the solution is heated to 50° C. with stirring. Over a period of 30 minutes, there is then added 31.6 g. of 95 percent paraformaldehyde with sufficient cooling so that the exothermic reaction does not raise the temperature of the reaction mixture above 65° C. When the addition of paraformaldehyde has been completed, the temperature is maintained at 65° C. for 30 additional minutes, following which the reaction mixture is heated to reflux for 1 hour. After cooling to 60° C., 400 ml. of hot 60° C.) water is introduced, and the mixture is stirred for several minutes to remove the benzenesulfonic acid from the benzene solution. After settling, the water layer is separated and discarded, and the benzene layer is evaporated to about half of its original volume. Then 500 ml. of hexane is added, and the mixture is cooled to 15° C., whereupon the reaction product 2,4,5-trichlorophenyl hemiformal crystallizes as fine white needles. The product is filtered off, washed with cold hexane, and dried to yield 211 grams of product having a melting point of 78° C. The yield is equivalent to 93 percent of the theoretical amount.

One gram mol of this 2,4,5-trichlorophenol hemiformal may be reacted with 1 gram mol of the trichlorophenyl ester of sulfuric acid from reaction (2), in the presence of a solvent, to form 1 gram mole of hexachlorophene in accordance with reaction (3).

EXAMPLE 3

197.5 grams of 2,4,5-trichlorophenol having a melting point of 65° C. and 60 grams of toluenesulfonic acid are dissolved in 500 ml. of benzene and with stirring 31.6 grams of 95 percent paraformaldehyde is added over 15 minutes. The heat of reaction raises the temperature of the reaction mixture to about 60° C. and after 15 minutes of additional stirring at that temperature, the mixture is heated to reflux for one half hour. The reaction mixture is then washed with 500 ml. of hot water to remove the toluenesulfonic acid catalyst. The washed reaction mixture is added to 900 ml. of perchloroethylene, and the lower boiling benzene is removed from the mixture by fractional distillation. The remaining solution of 1 gram mol of 2,4,5-trichlorophenyl hemiformal in perchloroethylene is now ready for use in reaction (3).

It will be noted that in the preceding example 1 the above described reaction (2) is effected by adding 116 g. of chlorosulfonic acid to a solution of 197.5 g. of 2,4,5-trichlorophenol in 1 liter of chloroform as the solvent. Equivalent amounts of other solvents, such as perchloroethylene, chloroform, methylenechloride, ethylenedichloride, or carbontetrachloride may be used in place of the chloroform. Furthermore, in reaction (2) mol. of fluorosulfonic acid may be used in place of 1 mol. of chlorosulfonic acid, and the gas which evolves is hydrogenfluoride which may or may not be used to catalyze reaction (1).

I claim:

1. In a method of producing hexachlorophene the steps of; (1) reacting 1 mol. of 2,4,5-trichlorophenol with 1 mol. of formaldehyde, in a solvent and under the influence of an acid catalyst, to from 1 mol. of 2,4,5-trichlorophenyl hemiformal; (2) reacting another mol. of 2,4,5-trichlorophenol with 1 mol. of chlorosulfonic acid, in the presence or absence of a solvent, to form 1 mol. of 2,4,5-trichlorophenyl sulfate; and (3) reacting 1 mol. of each of the products from steps (1) and (2), in a solvent, to form 1 mol. of hexachlorophene.

2. The method of claim 1 in which the said solvent in step (1) is selected from the group consisting of benzene, toluene, ligroin, methylene chloride, ethylene chloride, chloroform and perchloroethylene, and in which the said acid catalyst in step (1) is selected from the group consisting of benzenesulfonic acid, toluenesulfonic acid, dry or aqueous hydrochloric acid and dilute sulfuric acid.

3. The method of claim 1 in which the said solvent in step (2), when present, is selected from the group consisting of chloroform, methylenechloride, ethylene, dichloride, perchloroethylene and carbontetrachloride.

4. The method of claim 1 in which the said 1 mol. of chlorosulfonic acid in step (2) is replaced by 1 mol. of fluorosulfonic acid.

5. The method of claim 2 in which the said solvent in step (2), when present, is selected from the group consisting of chloroform, methylenechloride, ethylene dichloride, perchloroethylene and carbontetrachloride.

6. The method of claim 1 in which the said solvent in step (3) is selected from the group consisting of benzene, toluene, dipropyl ether, methylene chloride, ethylene chloride, chloroform, perchloroethylene, and mixtures thereof.

7. The method of claim 2 in which the said solvent in step (2), when present, is selected from the group consisting of chloroform, methylenechloride, ethylene dichloride, perchloroethylene and carbontetrachloride.

8. The method of claim 7 in which the said solvent in step (3) is selected from the group consisting of benzene, toluene, dipropyl ether, methylene chloride, ethylene chloride, chloroform, perchloroethylene, and mixtures thereof.

9. The method of claim 8 in which the said solvent in step (1) is chloroform, the said solvent in step (2) is chloroform, the said solvent in step (3) is chloroform, and in which the evolved hydrochloric acid from step (2) is used as the said acid catalyst in step (1).

10. The method of claim 8 in which the said solvent in steps (1) and (3) is benzene, and in which the evolved hydrochloric acid from step (2) is used as the said acid catalyst in step (1).

* * * * *